Patented Nov. 22, 1932

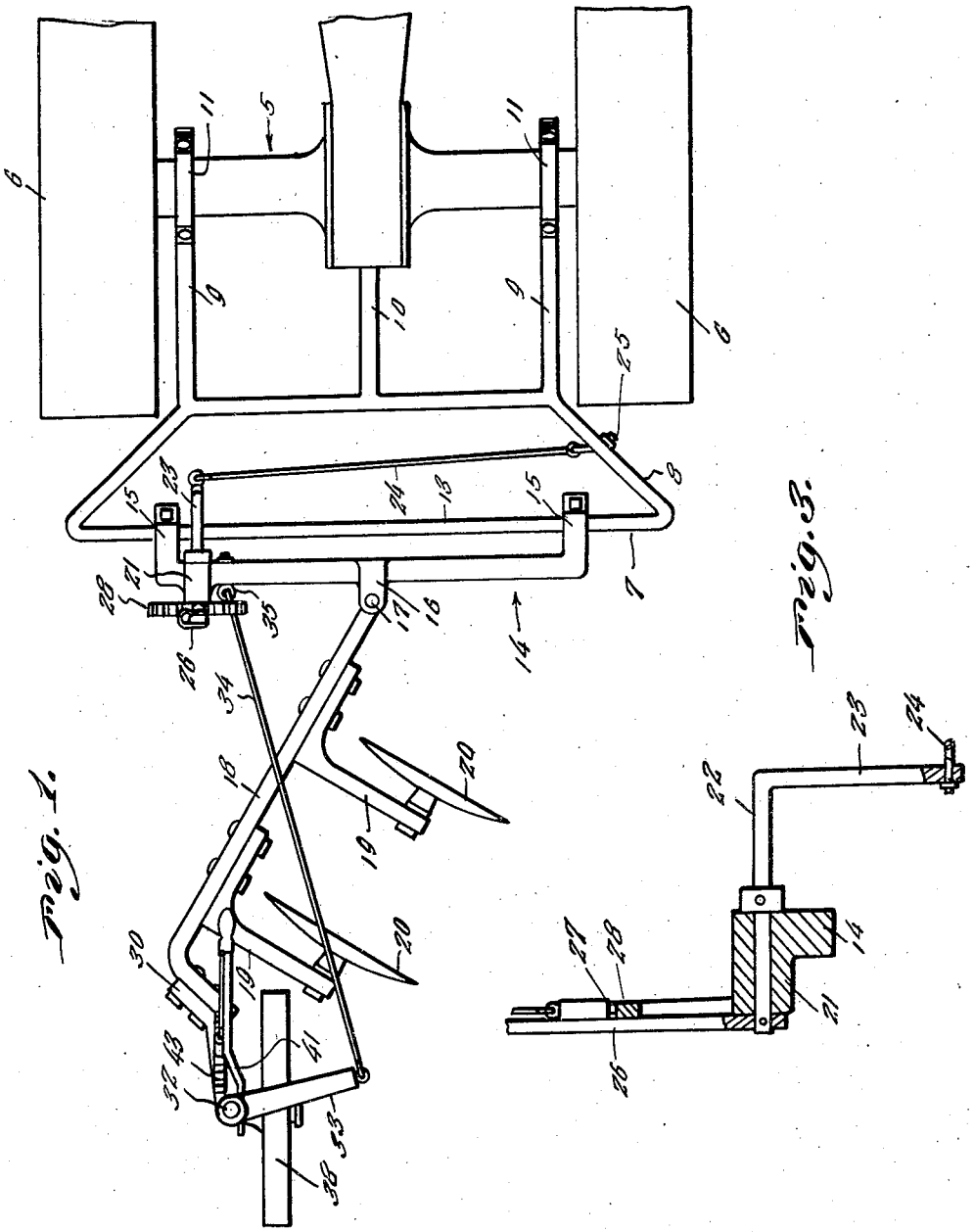

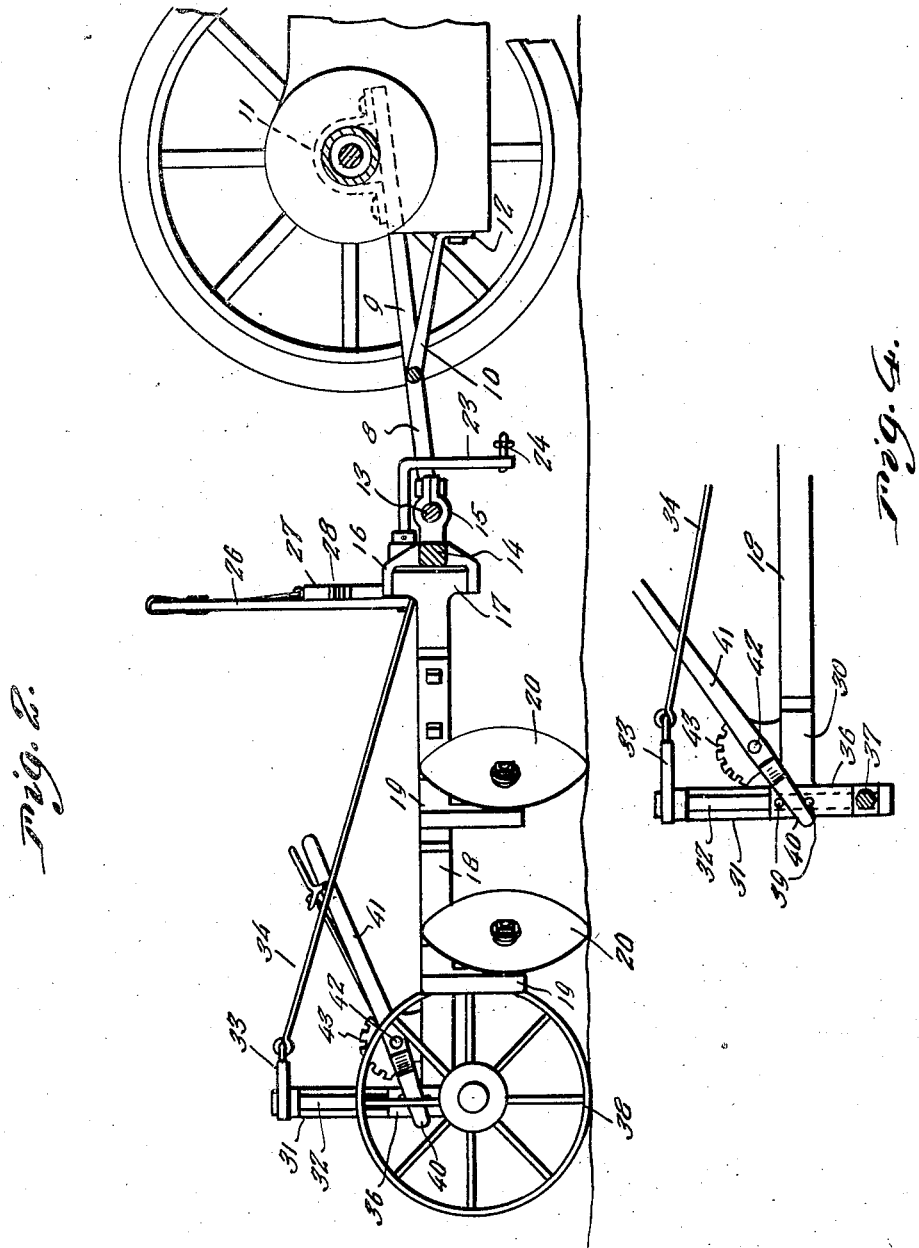

1,888,876

UNITED STATES PATENT OFFICE

ALTON MAHAN, OF RYDAL, GEORGIA

TRACTOR PLOW

Application filed November 7, 1931. Serial No. 573,655.

This invention relates to farm equipment and machinery and has specific reference to an attachment for a conventional motor tractor wherein said attachment is in the nature of a plow and forms a permanent part of the tractor whereby to provide a complete structure which may be unitarily referred to as a tractor plow.

I am well aware of the fact that this broad combination is not new in the prior art to which the invention relates. Therefore, my primary aim is to generally improve upon structures of this classification by providing an organization characterized by a careful selection of appropriately related parts all co-operating in a simplified manner to produce a structurally distinguishable and novel contribution to the prior art.

In carrying the improved inventive conception into actual practice, I have discovered a unique assemblage of parts which provides the requisite result of efficiency and simplified operation, the principal idea being in utilizing a structure which is susceptible of convenient depth regulation and capable of following the line of movement of the tractor due to the presence in said structure of proper steering connection between the plow and tractor.

In the drawings:

Figure 1 is a top plan view of a fragmentary portion of a tractor with the plow hitched thereto.

Figure 2 is a side elevational view with portions in section.

Figure 3 is a detail sectional and elevational view of the lateral shifting mechanism.

Figure 4 is a detail view of the ground wheel hoist.

In Figure 1, the rear axle structure of the tractor is designated by the numeral 5 and the tractor wheels are indicated at 6. There is an especially designed frame 7 attached to the axle structure between the wheels and this frame includes a horizontally disposed portion 8 having integral attaching arms 9 and 10. The two outer arms 9 are secured by clamps 11 to the rear axle housing while the central short arm 10 is fastened or anchored in place as indicated at 12 in Figure 2. This provides a rigid connection of the frame structure to the axle housing of the tractor.

Mounted on the rear bar member 13 of the frame is a yoke 14 having bearings 15 at its opposite ends slidably and rockably mounted to allow side shifting and raising and lowering of the plow structure. There is a clevis at 16 carried by the central portion of the yoke and this serves to accommodate a T-head 17 forming an integral part of the plow beam 18.

The plow beam is formed with L-shaped brackets 19 carrying the concavo-convex cultivating disks 20.

At the left hand end of the yoke is a bearing 21 which as seen in Figure 3 serves to accommodate a rockably mounted crank 22. The vertical arm 23 of the crank has pivotal connection with a push-pull rod 24 detachably anchored at 25 to one of the end bars of the frame proper.

The horizontal arm of the crank is provided with an upstanding adjusting lever 26 equipped with pawl mechanisms 27 co-operable with the teeth of a segmental rack 28 fixedly mounted on the yoke. Thus by rocking the crank through the medium of the lever 26, the yoke 14 can be shifted transversely of the line of draft or longitudinally back and forth from the bar member 13 of the frame structure to vary the position of the plow.

There is a fixture at the rear end of the plow beam which embodies a bracket 30 and an upright 31 having a vertical shaft 32 thereon. Rigidly secured to the upper end of the shaft is an arm 33 secured by a tie rod 34 to an I-bolt 35 secured near the bearing 21 on the yoke. The shaft 32 may be said to form a rocker and the arm 33 constitutes an actuating or rocker arm therefor, and keyed slidably on this shaft 32 is a sleeve 36 carrying a stub axle 37 on which the ground engaging wheel 38 is mounted.

Through the medium of this shaft 32, arm 33 and tie rod 34, the ground engaging wheel is operated to vary its angle laterally with respect to the longitudinal line of draft of the tractor. Consequently as the yoke 14 is shifted back and forth on the frame by way of the lever 26, this operating connection 34 serves to automatically adjust the angularity of the ground engaging wheel, causing the plow to follow the line of movement of the tractor.

As seen in Figure 4, the sleeve 36 is provied with spaced studs or pins 39 between which the end 40 of a hoisting lever 41 is positioned. The hoisting lever is pivoted at 42 on a rack segment 43 fixedly mounted on the bracket 30, suitable pawl mechanism being provided for maintaining the lever in adjusted position.

This pawl and rack mechanism together with the lever and sleeve forms the means for raising and lowering the ground wheel with respect to the shaft 32 and allowing the plow beam to regulate the depth of cut of the plow discs 20.

The gist of the invention is in the provision of an arm equipped substantially rectangular frame rigidly secured to the rear axle housing on the tractor, said frame constituting a mounting for the yoke and the yoke being rockable and slidable on the rear frame bar 13 thereof. Novelty is also believed to reside in the specific construction of the yoke provided with a bearing 21 to accommodate its crank 22 which in turn co-operates with the link 24 and lever 26 to bodily shift the yoke and associated structure laterally in either direction with respect to the longitudinal line of draft of the tractor.

The central pivotal connection of the forward end of the beam 18 to the adjustable yoke 14 adds its proportionate degree of novelty and efficiency. Moreover, the ground engaging wheel and specific mounting contributes a further share in the self-adjusting and steering means and further provides an arrangement for gauging or determining the depth of cut of the discs 20. Consequently all of these specific details form important factors of the organization as a whole to fulfill the requirements of a structure of this class in a highly satisfactory manner.

It is thought from the foregoing description that the advantages and novel features of the invention will be readily apparent. It is to be understood that changes may be made in the construction and in the combination and arrangement of the several parts provided that such changes fall within the scope of the appended claims.

I claim:

1. In a structure of the class described, in combination, a tractor, a frame structure rigidly secured to the tractor, a yoke rockably and slidably mounted on said frame structure, adjusting and retaining means between the frame structure and yoke for bodily shifting the yoke laterally with respect to the longitudinal line of draft, a diagonally disposed plow beam pivotally connected to the central portion of the yoke, a ground engaging wheel adjustably fulcrumed on a vertical turning axis at the rear end of said beam, and plow discs carried by said beam.

2. In a structure of the class described, in combination, a tractor, a frame structure comprising a frame proper including a plurality of forwardly extending arms, a substantially U-shaped yoke having its arms terminating in bearings slidably and rockably mounted on the rear frame bar, the bight portion of said yoke being formed with a clevis, and one end of the yoke being formed with a horizontal bearing, a crank having its horizontal arm mounted for oscillation in said bearing, a rod connection between the vertical arm and one end bar of the frame, a lever secured to the horizontal arm of the crank and provided with a pawl, and a rack segment on said yoke with which said pawl is co-operable, together with a plow including a beam pivotally attached to said clevis.

3. In a structure of the class described, in combination, a tractor, a substantially rectangular frame secured to the rear end portion of the tractor, a yoke slidably and rockably mounted on said frame, adjusting and retaining means for the yoke, a plow including a beam pivotally connected at its forward end to the central portion of the yoke, a wheel mounting including an upright attached to the rear end of said beam, an oscillatory vertical rocker shaft carried by the uprights and provided at its upper end with a rocker arm, a link connection between the rocker arm and one end portion of said yoke, a sleeve adjustable on said shaft and turnable with the shaft provided with a trunnion, a ground engaging wheel mounted on said trunnion, and plow discs carried by said beam.

4. In a structure of the class described, in combination, a tractor, a substantially rectangular frame secured to the rear end portion of the tractor, a yoke slidably and rockably mounted on said frame, adjusting and retaining means for the yoke, a plow including a beam pivotally connected at its forward end to the central portion of the yoke, a wheel mounting including an upright attached to the rear end of said beam, an oscillatory vertical rocker shaft carried by the upright and provided at its upper end with a rocker arm, a link connection between the rocker arm and one end portion of said yoke, a sleeve adjustable on said shaft and turnable with the shaft provided with a trunnion, a ground engaging wheel mounted on said trunnion, and plow discs carried by said beam, a segmental rack on the rear end portion of the beam, a lever pivotally mounted on said rack and provided with a pawl co-operable with the teeth of the rack, said sleeve being formed with spaced raising and lowering pins, and the adjacent end of said lever being positioned between said pins to permit the sleeve to be raised and lowered on said shaft to adjust the elevation of the wheel with respect to the disc.

In testimony whereof I affix my signature.

ALTON MAHAN.